(12) United States Patent
Li et al.

(10) Patent No.: US 12,182,560 B2
(45) Date of Patent: Dec. 31, 2024

(54) DEPENDENCY-BASED SOFTWARE UPGRADING

(71) Applicant: International Business Machines Corporation, Armonk, NY (US)

(72) Inventors: Qi Li, Beijing (CN); Bo Tong Liu, Beijing (CN); Li Cao, Beijing (CN); Jun Long Xiang, Beijing (CN); Yan Wei Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 17/470,047

(22) Filed: Sep. 9, 2021

(65) Prior Publication Data

US 2023/0073623 A1 Mar. 9, 2023

(51) Int. Cl.
*G06F 8/65* (2018.01)
*G06F 8/41* (2018.01)
*G06F 11/36* (2006.01)

(52) U.S. Cl.
CPC ............... *G06F 8/65* (2013.01); *G06F 8/433* (2013.01); *G06F 11/3688* (2013.01)

(58) Field of Classification Search
CPC ..... G06F 8/60; G06F 8/61; G06F 8/65; G06F 8/71; G06F 11/366; G06F 11/3684; G06F 11/3688
See application file for complete search history.

(56) References Cited

U.S. PATENT DOCUMENTS

| | | | |
|---|---|---|---|
| 9,449,405 B2 | 9/2016 | Krueger | |
| 2004/0181790 A1 | 9/2004 | Herrick | |

(Continued)

FOREIGN PATENT DOCUMENTS

| | | |
|---|---|---|
| CN | 100501697 C | 6/2009 |
| JP | 5025901 B2 | 9/2012 |
| WO | 2018040926 A1 | 3/2018 |

OTHER PUBLICATIONS

"Automated installs of software solutions using a dynamic dependency system," IP.Com, An IP.com Prior Art Database Technical Disclosure, Original Publication Date: Jan. 20, 2005, IP.com No. IPCOM000035204D, IP.com Electronic Publication Date: Jan. 20, 2005, 3 pages, https://priorart.ip.com/IPCOM/000035204.

(Continued)

*Primary Examiner* — Duy Khuong T Nguyen
(74) *Attorney, Agent, or Firm* — Scott S. Dobson

(57) ABSTRACT

A method, system, and computer program product for dependency-based software upgrading. The method may include determining respective dependency degrees between a plurality of software products based on property information related to a plurality of upgraded versions of the plurality of software products, a target software product depending on the plurality of software products. The method may also include dividing the plurality of software products into a plurality of groups of software products based on the respective dependency degrees. The method may also include determining a plurality of test scores associated with the plurality of groups, each test score indicating a performance enhancement degree of the target software product achieved by installing upgraded versions of at least one software product comprised in one of the plurality of groups. The method may also include determining a target upgrade solution for the target software product based on the plurality of test scores.

17 Claims, 11 Drawing Sheets

(56) References Cited

U.S. PATENT DOCUMENTS

| | | | | |
|---|---|---|---|---|
| 2008/0201705 A1* | 8/2008 | Wookey | .................. | G06F 8/658 |
| | | | | 717/175 |
| 2018/0074819 A1 | 3/2018 | St. John et al. | | |
| 2020/0057625 A1* | 2/2020 | Livne | ........................ | G06F 8/62 |
| 2021/0182042 A1* | 6/2021 | Saha | ........................ | G06F 8/61 |
| 2022/0398073 A1* | 12/2022 | Chopra | .................... | G06F 8/65 |

OTHER PUBLICATIONS

"Keeping your dependencies updated automatically," GitHub, Nov. 5, 2020, 2 pages, https://docs.github.com/en/free-pro-team@latest/github/administering-a-repository/keeping-your-dependencies-updated-automatically.

Kamalizade, "How to Automate Dependency Updates in Your Software Projects," Medium.com, Jun. 2, 2020, 6 pages, https://medium.com/better-programming/how-to-automate-dependency-updates-in-your-software-rojects-8cf609e092b.

Arkins, "Dependency Management: 3 Tips to Keep You Sane," WhiteSource Software, Mar. 19, 2020, 4 pages, https://www.whitesourcesoftware.com/free-developer-tools/blog/dependency-management/.

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

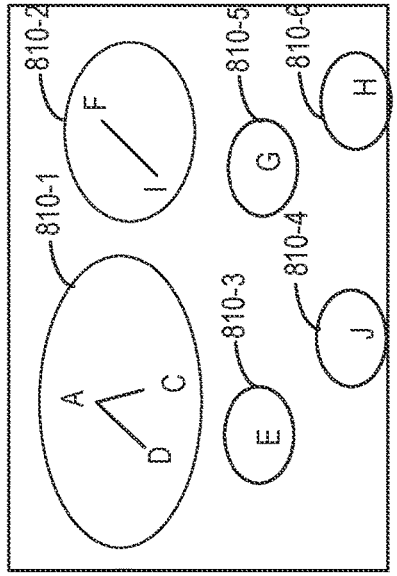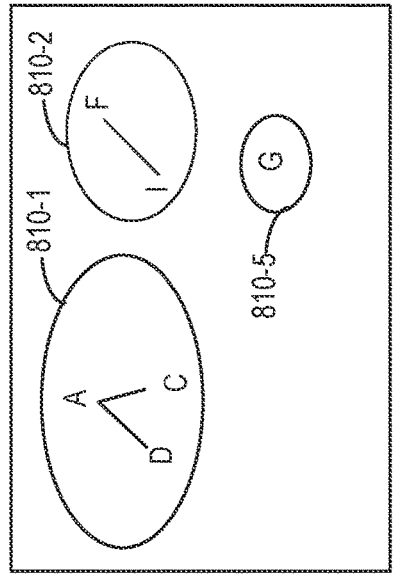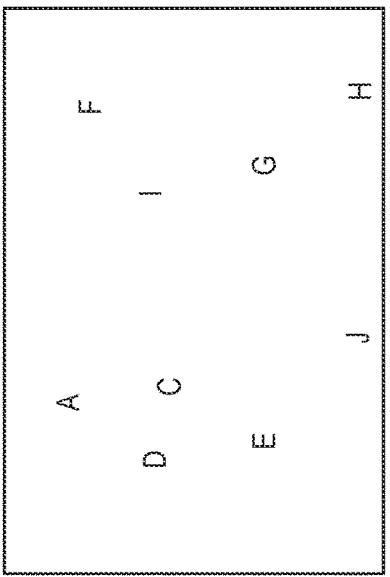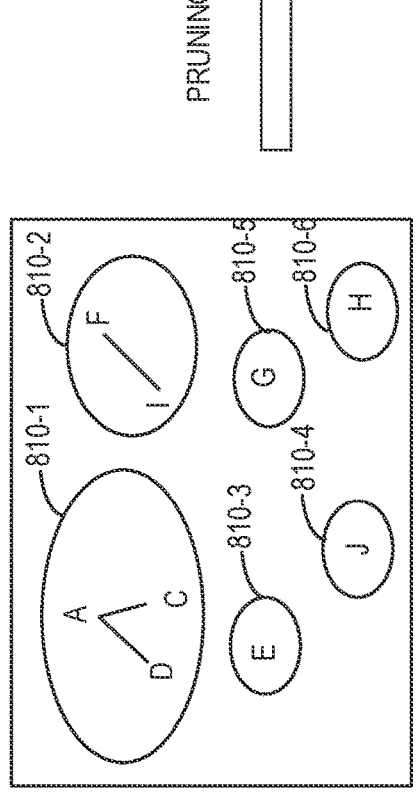
FIG. 8A
FIG. 8B

DEPENDENCY-BASED SOFTWARE UPGRADING

BACKGROUND

The present disclosure relates to computer techniques and more particularly, to a method, system, and computer program product for dependency-based software upgrading.

Typically, a software product depends on a lot of other software products. For example, a target software product may depend on open source products, code libraries, application server libraries, application programming interfaces (APIs) provided by Cloud, other internal products, and the like. In one example, the dependent software products may be integrated and considered as software components of the target software product. As the technologies are constantly evolving and at the same time the size, speed, complexity, hardware architecture, and other factors associated with the software products may change, the software products may be upgraded and new versions may be issued. The target software product may also need to be carefully maintained in order to update some or all of the software products to their upgraded versions.

SUMMARY

The present invention provides a computer-implemented method, system, and computer program product for dependency-based software upgrading. The method may include determining, by one or more processors, respective dependency degrees between a plurality of software products based on property information related to a plurality of upgraded versions of the plurality of software products, a target software product depending on the plurality of software products. The method may also include dividing, by one or more processors, the plurality of software products into a plurality of groups of software products based on the respective dependency degrees, each group comprising at least one of the plurality of software products. The method may also include determining, by one or more processors, a plurality of test scores associated with the plurality of groups, each test score indicating a performance enhancement degree of the target software product achieved by installing at least one upgraded version of at least one software product comprised in one of the plurality of groups. The method may also include determining, by one or more processors, a target upgrade solution for the target software product based on the plurality of test scores, the target upgrade solution indicating upgrading of at least one software product comprised in at least one of the plurality of groups. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 8A depicts a first example for determining a target upgrade solution in accordance with some embodiments of the present disclosure.

FIG. 8B depicts a second example for determining a target upgrade solution in accordance with some embodiments of the present disclosure.

Figure 1:
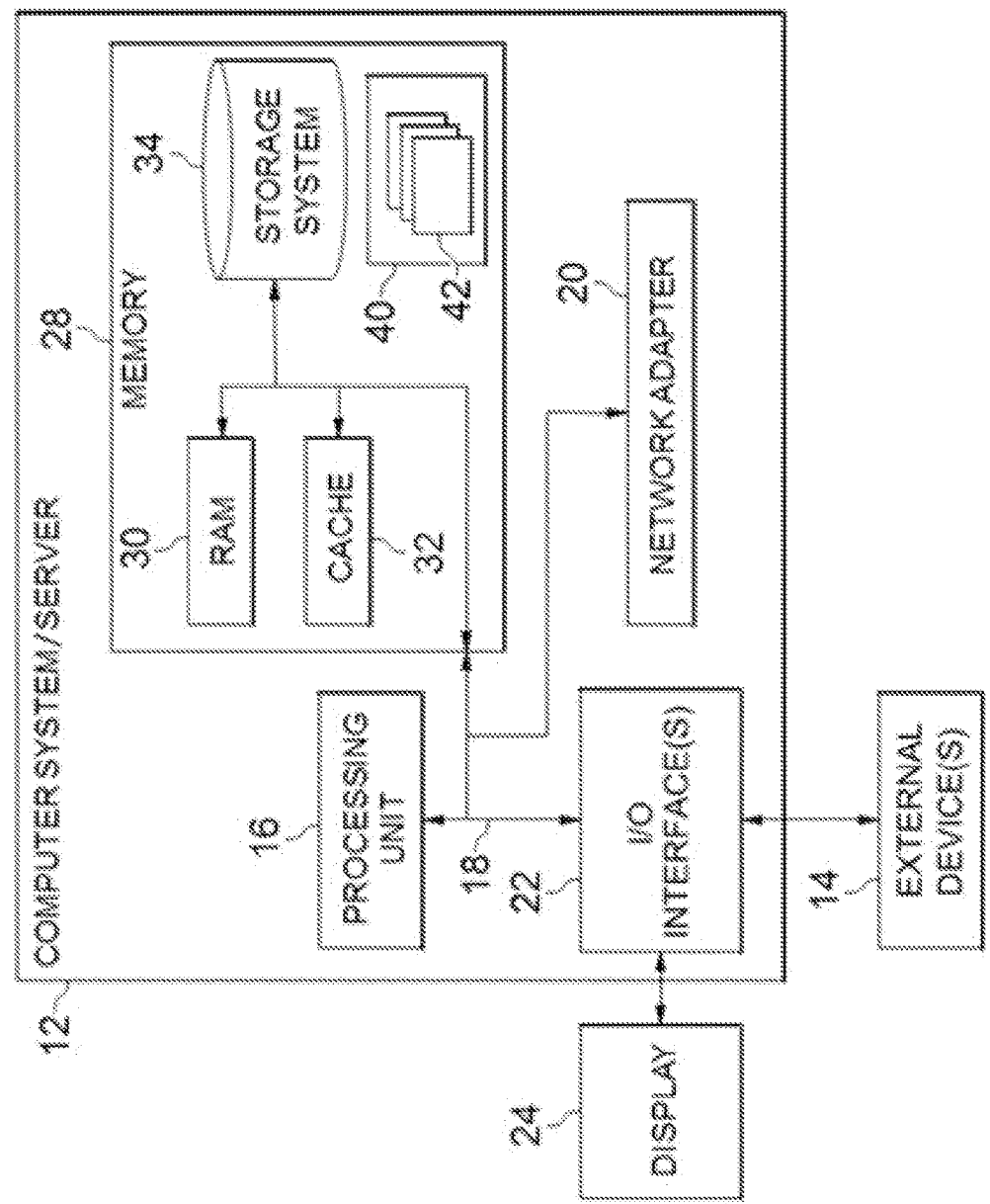
FIG. 1 depicts a cloud computing node according to some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
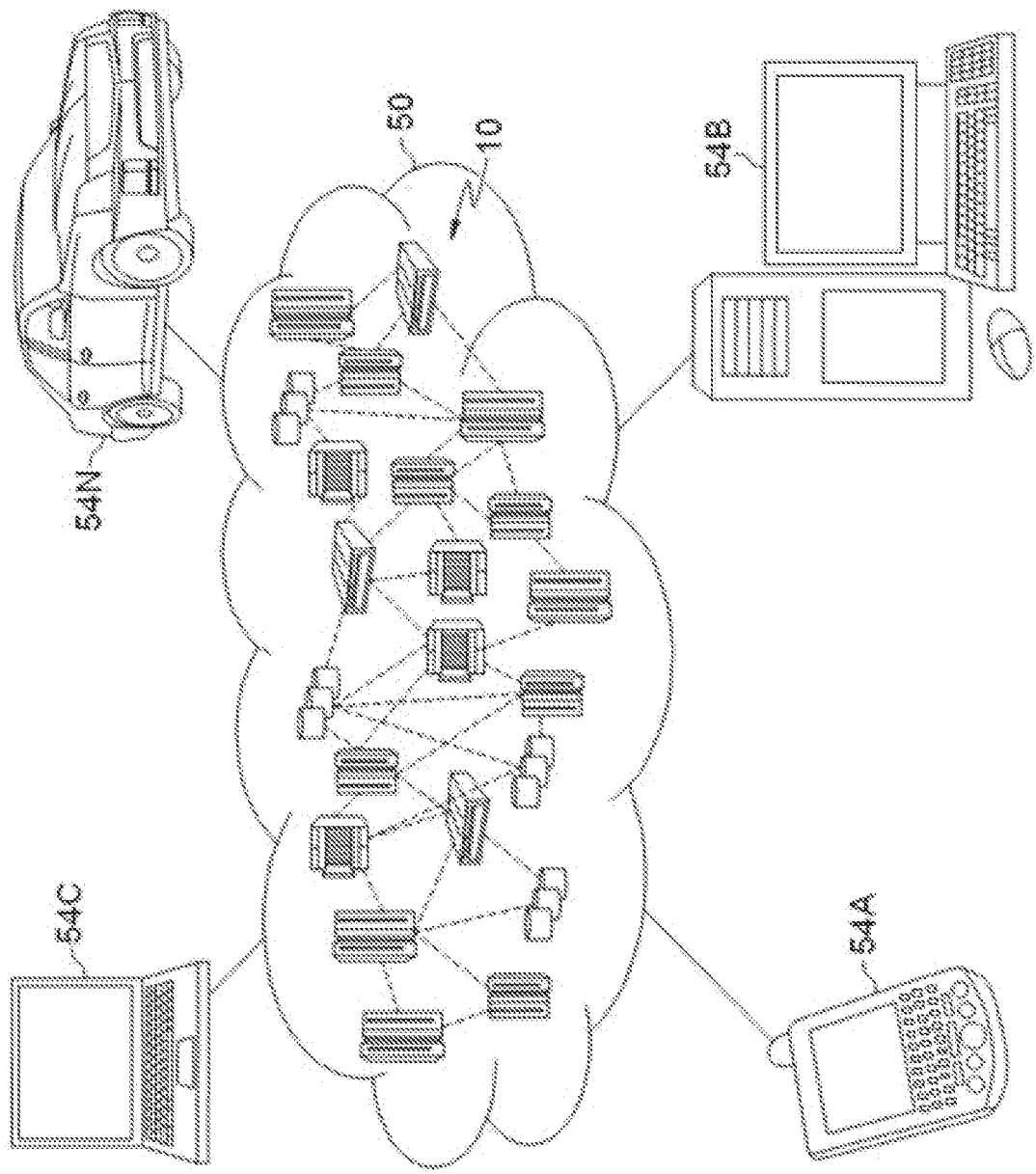
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
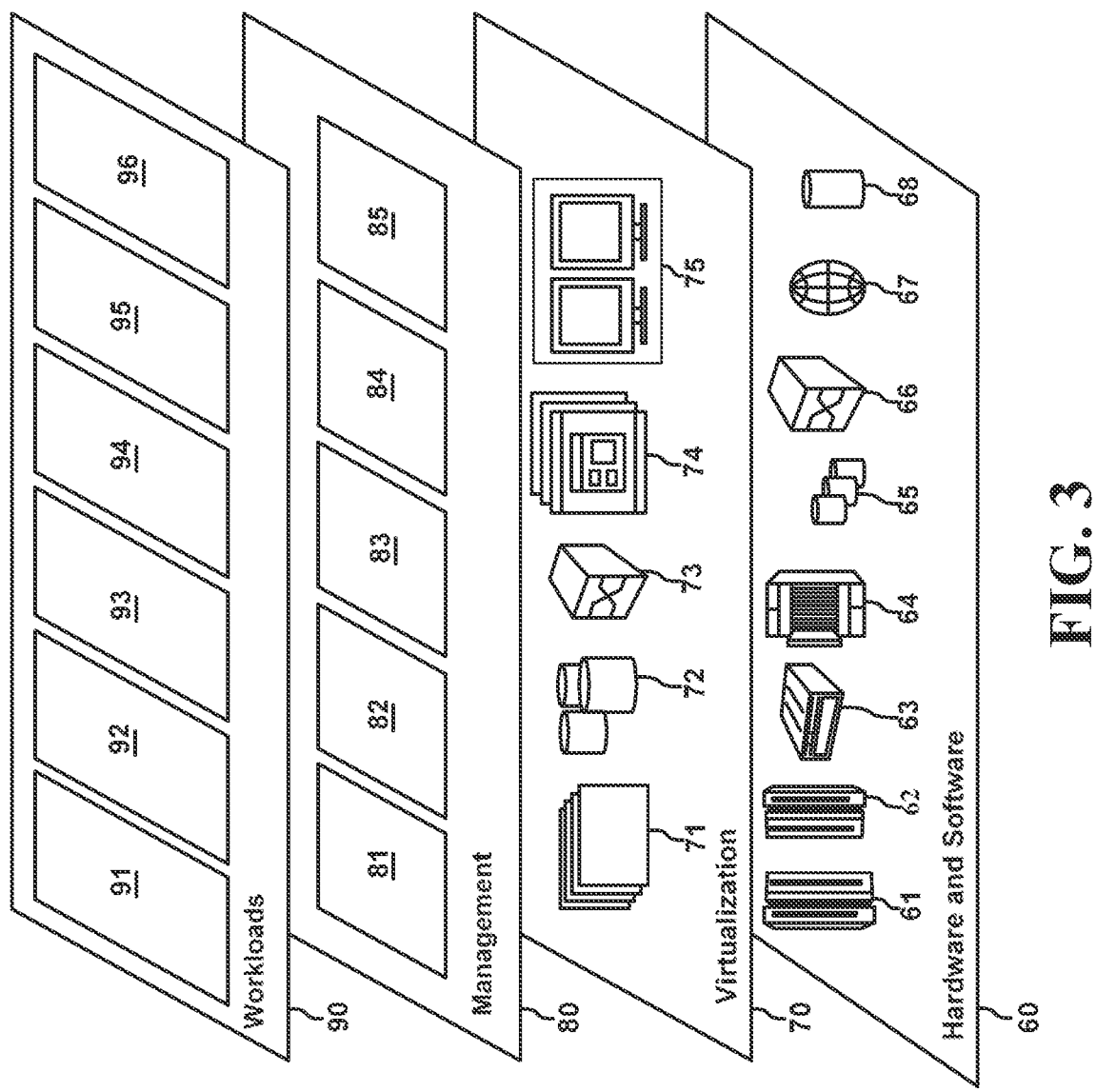
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software upgrading 96. The functionalities of software upgrading 96 will be described in the following embodiment of the present disclosure.

As used herein, the term "software" or "software product" refers to a software program, an application, a library, an application programming interface (API) a service provided by Cloud, other internal product, and the like.

A dependency relationship, or for brevity, a "dependency" or a "software dependency" represents a functional relationship between two software products. A dependency can be described as representing that one software product depends on another software product. Thus, a software product "A" can be considered to depend on a software product "B" when the software product "A" functions as intended only if the software product "B" is also available. For example, online payment software may note operate correctly if bank account software is unavailable.

A target software product and the software products it depends on may be running in a target runtime environment. Sometimes the owner of the target software product may need to upgrade the target software and/or some of other software products to the latest versions, in order to fit the new runtime environment or get better performance.

Traditionally, the methods to maintain the software upgrading can be difficult and expensive. Sometimes if any software product does not upgrade successfully or becomes incompatible with other software products as a result of the upgrade, the entire target software product may be rendered inoperable. Typically, to update the dependencies, a lot of investigation, prototype and test work are required to make sure the upgrade is successful. Therefore, a large amount of manual effort is required to construct candidate upgrade solutions and test the candidate upgrade solutions to select a desired upgrade solution. By testing the candidate upgrade solutions, it is possible to filter out the upgrade solutions that may cause deteriorated perform upgrading or crashing on the target software product. However, due to the larger number of possible different combinations of software products to be upgraded, such a software upgrade process is inefficient.

According to example embodiments of the present disclosure, there is proposed an improved solution for software upgrading. In this solution, for a plurality of software products on which a target software product depends, dynamic dependency degrees between the software products are analyzed and used to group the software products into a plurality of groups. For each of the plurality of groups, one or more test scores are determined to measure a performance enhancement degree of the target software product by installing at least one upgraded version of at least one software product comprised in one of the plurality of groups. A upgrade solution is determined for the target software product based on the plurality of test scores.

According to the solution, by grouping the software products based on the dynamic dependency relationship among the software products, the number of tests needed to be performed may be decreased, which can effectively reduce the time and/or resource cost for determining a desired upgrade solution for the target software product.

Other advantages of the present disclosure will be described with reference to the example embodiments and the accompanying drawings below.

Figure 4:
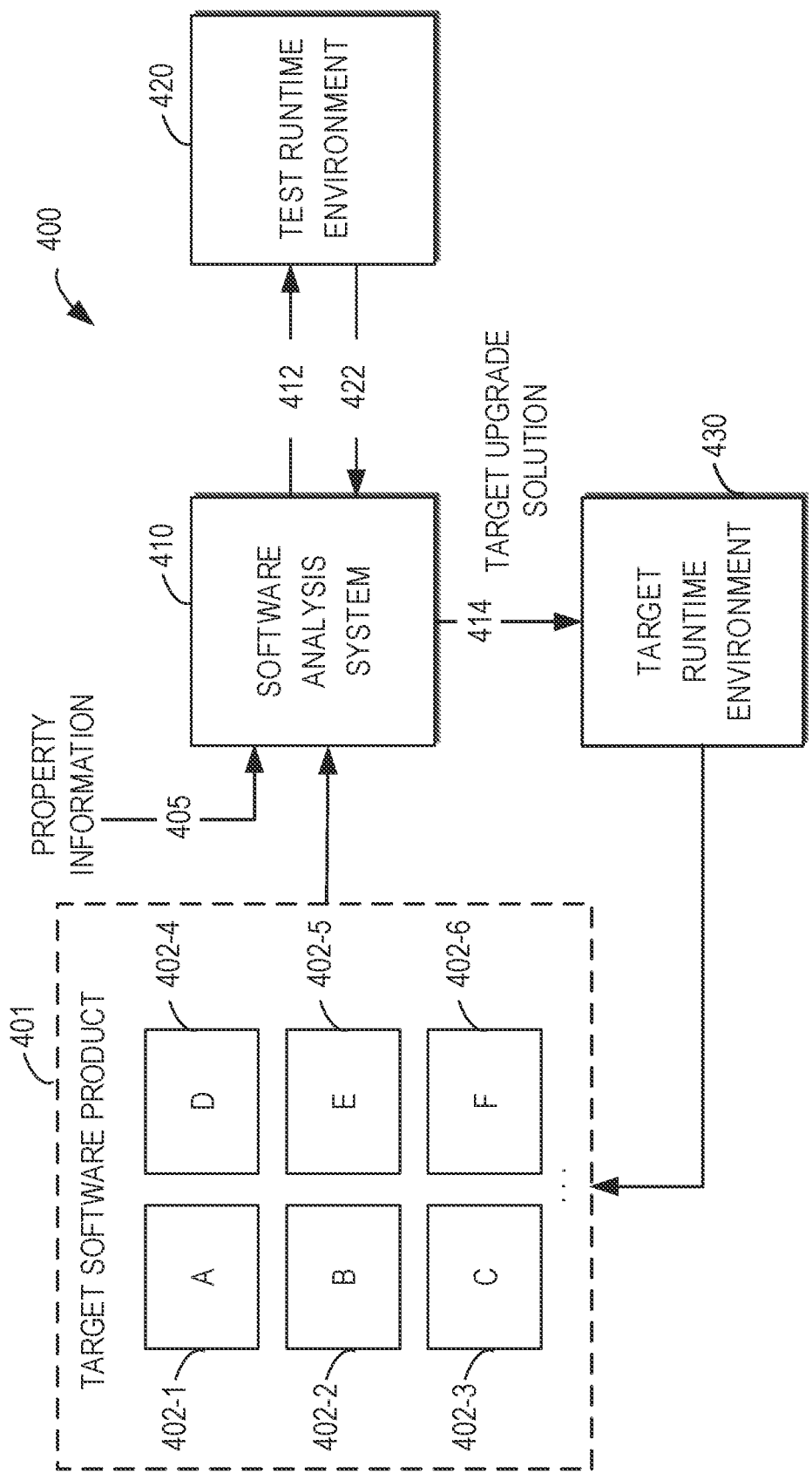
FIG. 4 depicts a block diagram of an example environment in accordance with some embodiments of the present disclosure.

Reference is now made to FIG. 4, which depicts a block diagram of an example environment 400 in accordance with some embodiments of the present disclosure. As illustrated, the environment 400 comprises a software analysis system 410 which is configured to determine a target upgrade solution for a target software product which depends on a plurality of other software products.

For the purpose of illustration, the target software product 401 in FIG. 4 is still taken here as an example. In this example, it is assumed that some of the software products on which the target software product 401 depends, including the software products 402-1 to 402-6, are updated and have their respective upgraded versions. The target software product 401 and the software products 402 may be installed in a target runtime environment 430, running with their current versions to perform corresponding tasks. The software analysis system 410 is configured to determine whether and which one or more of the software products 402 can be updated from their current version to their upgraded versions (if any), and determine a target upgrade solution 414 for the target software product 401.

According to embodiments of the present disclosure, the software analysis system 410 is configured to generate the target upgrade solution 414 by determining dependencies between the software products 402. The dependencies can be determined based on property information 405 related to corresponding upgraded versions of the software products 402. As such, the software analysis system 410 may be able to track the dynamic and latest software dependency as the software products 402 upgraded.

The environment 400 may further include a test runtime environment 420 for installing and running one or more software products. In some embodiments, the software analysis system 410 may provide an upgrade candidate 412 for the target software product 401. The upgrade candidate 412 may indicate upgrading at least one of the software products 402 for the target software product.

By attempted execution of the target software product 401 with one or more of the software products 402 updated to their upgraded versions, the software analysis system 410 may obtain a test score 422 indicating a performance enhancement degree of the target software product 401 achieved by installing at least one upgraded version of at least one software product 402 indicated in the upgrade candidate 412. In some embodiments, the software analysis system 410 may obtain a test result about the performance of the target software product 401 running in the runtime test environment and determine the test score 422 locally. The software analysis system 410 further determines the target upgrade solution 414 for the target software product 401 based on respective tests scores 422 determined for upgrade candidates 412.

In some embodiments, the target upgrade solution 414 may be provided to the target runtime environment 430 for the target software product 401 and may be automatically implemented in the target runtime environment 430. For example, the at least one upgraded version of at least one software product 402 indicated in the target upgrade solution 414 may be installed and run in the target runtime environment 430. In some embodiments, the target upgrade solution 414 may be presented to the user (e.g., the owner of the target software product 401) as a software upgrade recommendation. The target upgrade solution 414 may be implemented after a confirmation by the user and/or may be adjusted by the user.

Detailed embodiments of determining of the target upgrade solution 414 will be described in the following.

It would be appreciated that the test runtime environment 420 and the target runtime environment 430 shown in FIG. 4 may be implemented at any computing system/server having resources for execution of software product. It would be appreciated that the software analysis system 410 shown in FIG. 4 may be implemented as one or more software engines, modules, or the like, which are configured with logic for implementing the functionality attributed to the particular module. The functional components in the software analysis system 410 may be implemented using one or more of such software engines, modules, or the like. The software engines, modules, and the like are executed on one or more processors of one or more computing systems or devices and utilize or operate on data stored in one or more storage devices, memories, or the like, on one or more of the computing systems.

Figure 5:
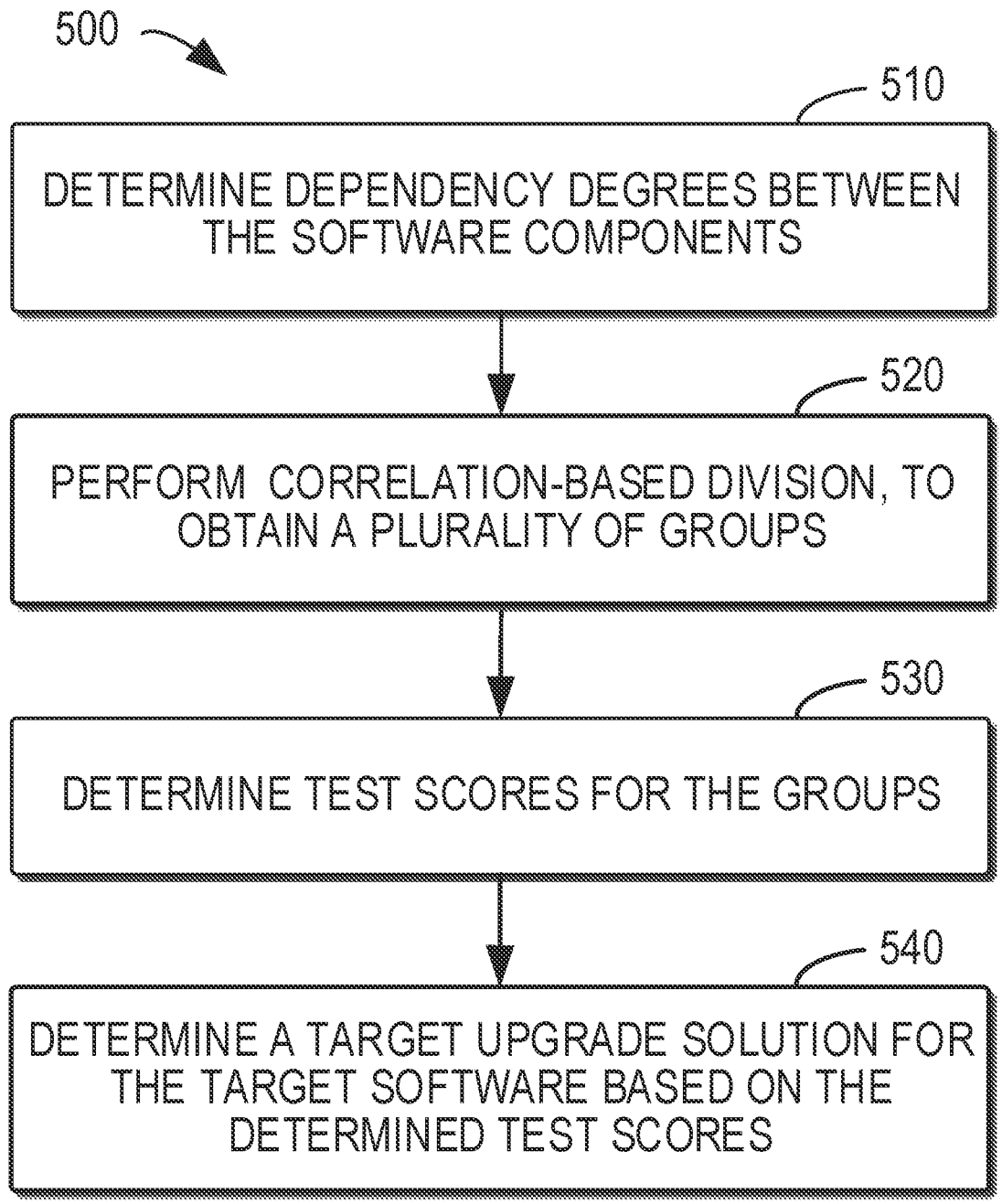
FIG. 5 depicts a flowchart of an example process for determining a target upgrade solution in accordance with some embodiments of the present disclosure.

FIG. 5 depicts a flowchart diagram of an example process 500 for determining a target upgrade solution in accordance with some embodiments of the present disclosure. The process 500 may be implemented at the software analysis 410.

At block 510, the software analysis system 410 determines respective dependency degrees between the software products 402 based on property information 405 related to corresponding upgraded versions of the software products 402.

In some embodiments, the software analysis system 410 may maintain dependency information for the target software product 401 and thus may identify the software products 402 and their upgraded versions on which the target software product 401 depends. In some embodiments, the determination of the target upgrade solution 414 for the target software product may be triggered manually or may be triggered by a detection that a threshold number of software products on which the target software product 401 depends have been identified.

The property information 405 may include a plurality of properties related to the upgraded versions and may be collected from various data sources related to the software products 402. In some embodiments, the property information 405 may related to an upgraded version of a software product 402 may include release information about the upgraded version, code execution information of the upgraded version, usage information of the upgraded version, and/or the like. In some embodiments, the release information may include, but is not limited to, a name, a license, an owner, a version number, technology code, class-path, prerequisites with one or more other software products, an extension list, signature properties, custom properties, and/or the like. In some embodiments, the code execution information may indicate the first commit, the commit history, the popularity of the upgraded version, an attention degree by users, and/or the like. In some embodiments, the usage information may indicate a usage application/scenario, the feature number, the test bucket, the last update time of the upgraded version, and the like.

Figure 6A:
FIG. 6A depicts an example of determining a dependency map from property information in accordance with some embodiments of the present disclosure.

FIG. 6A illustrates example property information 405 collected for the upgraded version of the software product 402. A column of "Property" 610 indicates the name of corresponding properties and a column of "Value" 612 indicates the property information elements. For each upgraded version of a software product, the corresponding property information may be collected.

The software analysis system 410 may determine the respective dependency degrees between the software products 402 based on the property information 405. A dependency degree between two software products 402 may indicate how much the two software products 402 are correlated with each other functionally, and thus may also be referred to as a correlation degree.

The software analysis system 410 may analyze the property information 405 in various ways. For instance, the software analysis system 410 may convert the property information elements into corresponding embedded values as indicated in a column of "Embedded Value" 620. The software analysis system 410 may apply various embedding techniques to convert the property information into scalar values. In some embodiments, weights may be set to respective types of properties, as indicated in a column of "Weight" 630. Each weight indicating an importance of the corresponding property in determining the dependency degrees. In some embodiments, the weights may be set by the users or may be predetermined in other ways.

In some embodiments, the software analysis system 410 may determine a dependency degree between every two of the software products 402, for example, by applying feature selection and/or a principle components analysis (PCA) method on the embedding values and the weights. The software analysis system 410 may generate a dependency map 640 as illustrated in FIG. 6A, which lists the dependency degrees among the software products 402 in the target software product 401. In this example, a dependency degree is measured by a value from 0 to 1. The higher the value of the dependency degree is, the stronger the two software products are correlated with each other or dependent from each other.

At block 520, the software analysis system 410 divides the software products 402 into a plurality of groups of software products based on the respective dependency degrees. Each group comprises at least one software product 402, and a software product 402 may not be classified into two groups.

In embodiments of the present disclosure, the dependency degrees enable the software analysis system 410 to perform dependency classification. In some embodiments, according to the respective dependency degrees, the software analysis system 410 may classify two or more software products that are determined to have relative strong dependencies into a group. The software products divided into different groups may determine to have lower dependency levels than the software products divided into the same groups. In some embodiments, the number of groups may be predetermined.

Figure 6B:
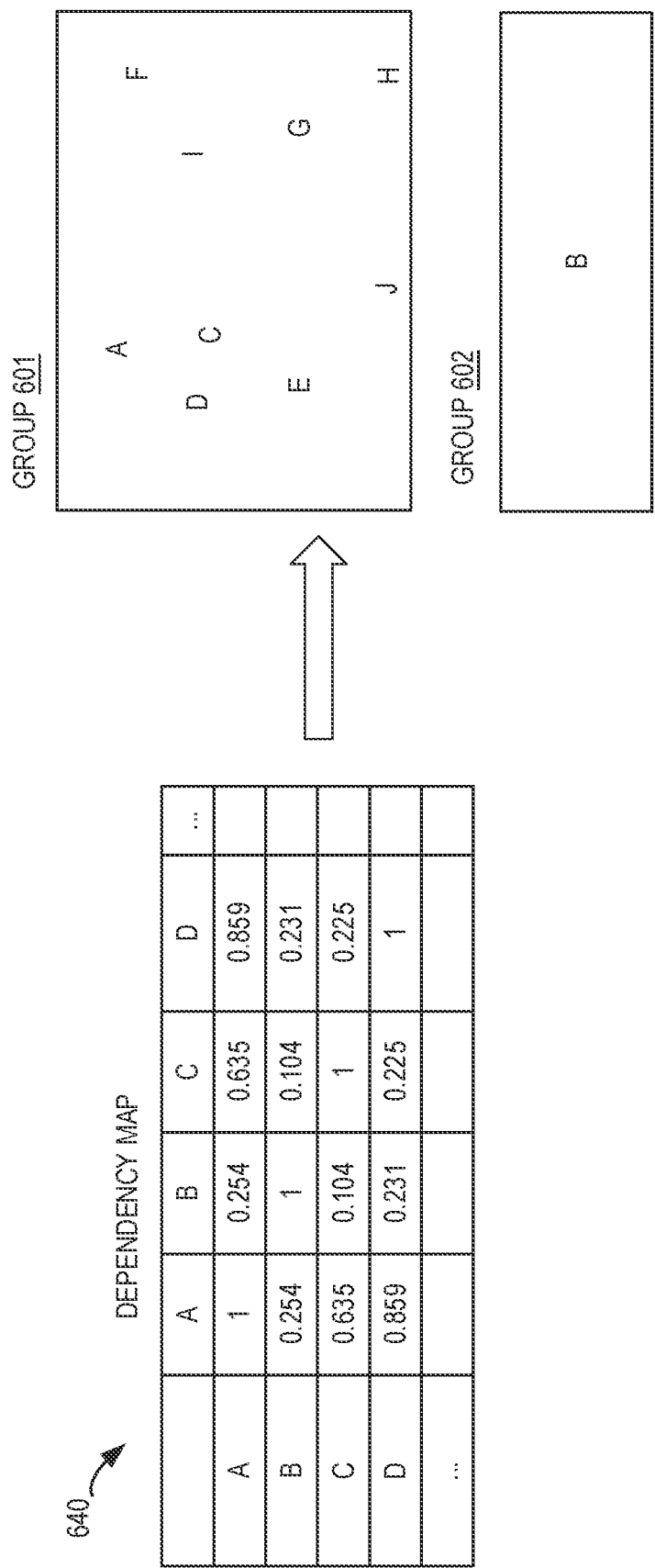
FIG. 6B depicts an example of group division based on the dependency degrees in accordance with some embodiments of the present disclosure.

FIG. 6B depicts an example of group division based on the dependency degrees. In this example, two groups are obtained based on the dependency map 640. A group 601 includes software products A, D, C, E, J, F, I, G, and H of the target software product 401. A group 602 includes a single software product B because this software product has little dependency on other software products. It would be appreciated that the example of FIG. 6B is provided for the purpose of illustration only, and other number of groups and other grouping manners may also be possible.

At block 530, the software analysis system 410 determines a plurality of test scores associated with the plurality of groups, each test score indicating a performance enhancement degree of the target software product 401 achieved by installing at least one upgraded version of at least one software product 402 comprised in one of the plurality of groups.

The performance enhancement degree or the test score may be determined based on a comparison between a benchmark for the target software product 401 and execution of the target software product 401 with the at least one upgraded version of at least one software product 402 installed in the test runtime environment 420. In some embodiments, the software analysis system 410 may prepare the test runtime environment 420 to be similar as the target runtime environment 430 for the target software environment. In some examples, a plurality of containers in a cloud computing environment may be provisioned as multiple test runtime environments to perform parallel tests.

When testing possible upgrade solutions for the target software product 401, the software analysis system 410 may consider the software products 402 in different groups to be independent from each other. Software products 402 from different groups may be upgraded together without decreasing or applying a negative impact on the target software product 401. Thus, the software analysis system 410 may evaluate one or more possible candidate upgrade combinations within each group, each candidate upgrade combination comprising at least one software product 402 comprised in that group.

A test score may be used to measure how much benefits the target software product 401 can achieve by upgrading the at least one software product 402 in each candidate upgrade combination. The software analysis system 410 may prepare the test runtime environment 420 and provision the target software product 401 with the at least one software product 402 indicated in each candidate upgrade combination to be updated to its upgrade version(s) in the test runtime environment 420. The software analysis system 410 or a software test tool may determine the test score associated with at least one software product 402 included in each group. One or more possible combination(s) of the software product(s) included in each group may be evaluated and the associated test score(s) may be determined.

In some embodiments, the determination of the test scores for a group of software products 402 may be optimized, which will be discussed in the following.

At block 540, the software analysis system 410 determines the target upgrade solution 414 for the target software product 401 based on the determined test scores. The target upgrade solution 414 indicates upgrading of at least one software product comprised in at least one of the divided groups, for example, to the corresponding upgraded version(s).

As the software products in different groups may not be dependent on each other or have little dependency, the software analysis system 410 may select one or more software products from each of the plurality of groups. For each group, the software analysis system 410 may select the at least one software product 402 (e.g., the candidate upgrade combination) for which a test score is determined to be relatively high. In some embodiments, the software analysis system 410 may select one or more software products from some but not all of the groups, for example, due to the low test scores determined for the software products in the unselected groups.

According to the embodiments of the present disclosure, by dividing a relatively large number of software products into a relatively small number of groups and performing software tests on the basis of the groups, the number of software combinations to be tested may be significantly decreased, which is more efficient and will reduce the effort and risk to do the software update.

Figure 7:
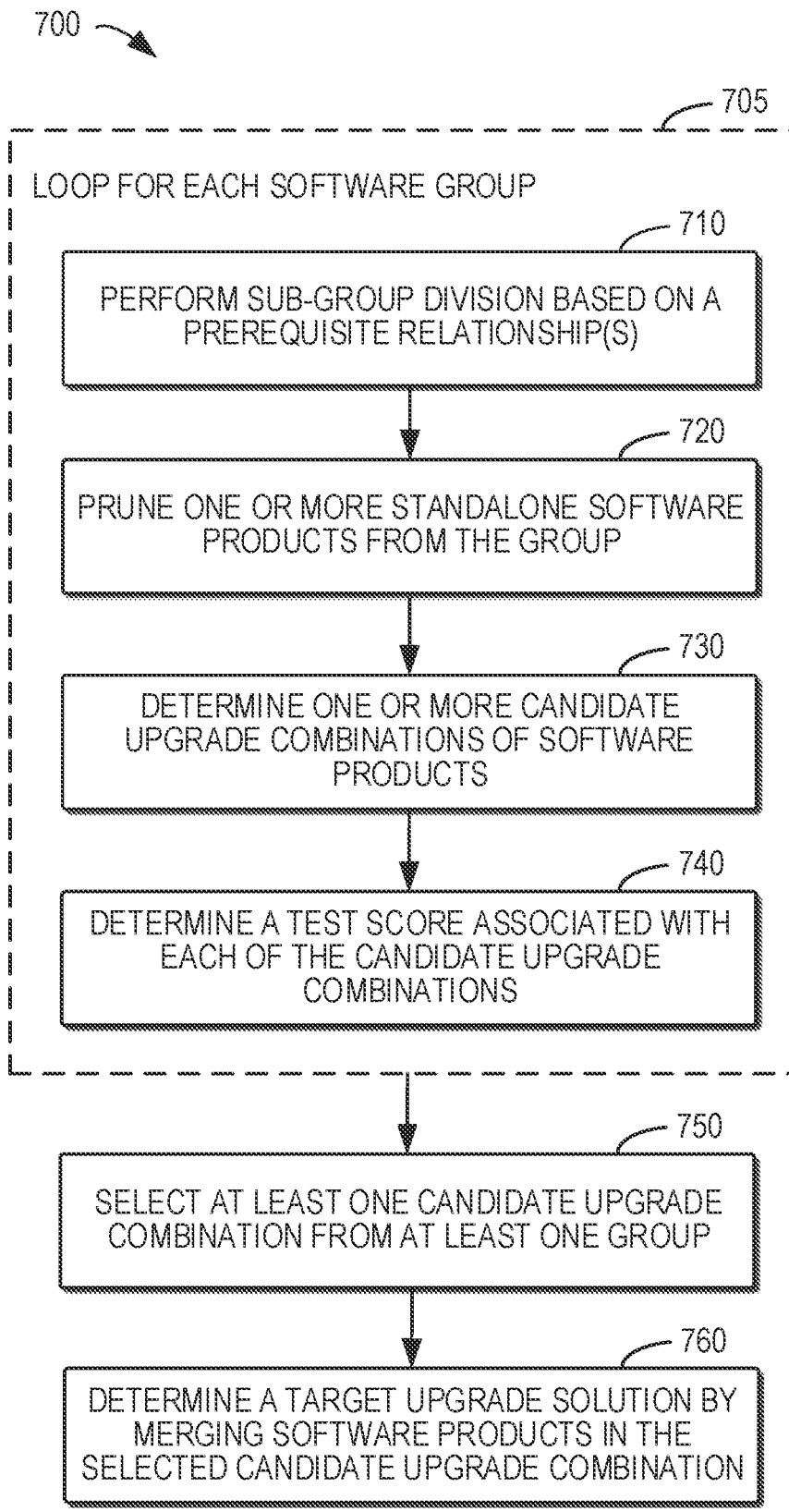
FIG. 7 depicts a flowchart of an example process for determining a target upgrade solution in accordance with some embodiments of the present disclosure.

FIG. 7 shows a flowchart of an example process 700 for determining a target upgrade solution in accordance with some embodiments of the present disclosure. The process 700 can be implemented at the software analysis system 410 as shown in FIG. 4. To better understand the process 700, references will be further made to FIGS. 8A-8D which depict examples for determining a target upgrade solution in accordance with some embodiments of the present disclosure.

The process 700 comprises a sub-process 705 which comprises a plurality of steps and may be looped for each of the plurality of groups divided from the software products 402. Depending on the software products comprised in each group, some of the steps in the process 700 may not be performed for some groups of software products.

Specifically, for a group, at block 710, the software analysis system 410 performs a sub-group division based on one or more prerequisite relationships between one or more pairs of software products comprised in the current group.

The software analysis system 410 may determine whether a prerequisite relationship is present between any pair of software products 402 in the current group. In this case, the current group under consideration may comprise two or more software products 402 if a prerequisite relationship is detected. The prerequisite relationship indicates that the pair of software products 402 is strongly dependent on each other and may not be separated in software upgrading. In some embodiments, the software analysis system 410 may determine whether two software products 402 has a prerequisite relationship based on software configuration files and/or script files of the two software products 402.

Based on the detecting result of the prerequisite relationship, the software analysis system 410 may divide the first group of software products into a plurality of sub-groups of software products. In the sub-group division, a pair of software products 402 may be comprised in a same sub-group. If a first software product 402 has a first prerequisite relationship with a second software product 402 and has a second prerequisite relationship with a third software product 402, the three software products 402 may be divided into a same sub-group. As a result, each sub-group may comprise at least one pair of software products having a prerequisite relationship or comprising a standalone software product having no prerequisite relationship with other software products.

FIG. 8A illustrates an example of sub-group divisions for the group 601 of FIG. 6B on the prerequisite relationship. Within the group 601, the software product A has a prerequisite relationship with the software product D and a further prerequisite relationship with the software product C, and the software product F has a prerequisite relationship with the software product I. Accordingly, the software products A, D, and C are divided into a sub-group 810-1, and the software products F and I are divided into a sub-group 810-2. The remaining standalone software products E, J, G, and H each have no prerequisite relationship with any other software products, and thus may be divided into separate sub-groups 810-3, 810-4, 810-5, and 810-6.

In some embodiments, if a group divided based on the dependency degrees comprises a standalone software products 402 (such as the group 602 in FIG. 6B which includes the software product B), and two or more software products included in a group has no prerequisite relationship, each of the software products may be included in a sub-group for the group.

At block 720, the software analysis system 410 prunes one or more standalone software products 402 comprised in the current group, to obtain a reduced group. By pruning one or more standalone software products, the reduced group may include a smaller number of software products, which may further reduce the number of candidate upgrade combinations to be tested.

In some embodiments, the software analysis system 410 may test a standalone software product 402 independently in the test runtime environment 420 for the target software product 401. More specifically, to test standalone software product 402, the software analysis system 410 may install an upgraded version of the standalone software product 402 in the test runtime environment 420 and thus other software products 402 may be run under their current version. The software analysis system 410 may determine a candidate test score associated with the standalone software product 402 based on the test process in the test runtime environment 420. The software analysis system 410 may compare the candidate test score with a threshold score (for the purpose of discussion, referred to as a first threshold score).

If the candidate test score is below (lower than or equal to) the first threshold score, the software analysis system 410 may discard the standalone software product 402 (and thus the sub-group) from the group in the current loop of the sub-process 705. In some examples, if the candidate test score is above (higher than or equal to) the first threshold score, the standalone software product 402 may be kept in the group. For each standalone software product 402 in the group, the software analysis system 410 may similarly determine whether the standalone software product 402 can be discarded or remained in the group.

FIG. 8B illustrates an example of pruning standalone software products from the group 601. As illustrated, the software analysis system 410 determines candidate test scores for the standalone software products E, J, G, H comprised in the sub-groups 810-3, 810-4, 810-5, and 810-6. It is assumed that the test scores are 0, 1, 15, and 3 for the standalone software products E, J, G, H, respectively, and the threshold score is 2. Thus, the standalone software products E, J, and H in the sub-groups 810-3, 810-4, and 810-6 are pruned from the group 601. Software product G in sub-group 810-5 may remain as it has a threshold score (i.e., 15) higher than the threshold score (i.e., 2). A reduced group 801 is then obtained, which includes software products divided into the sub-groups 810-1, 810-2 and 810-5.

At block 730, the software analysis system 410 determines one or more candidate upgrade combinations of software products 402 in the current group. The sub-groups are combined in different ways to generate one or more candidate upgrade combinations. The software products within a sub-group are placed in the same candidate upgrade combinations because those software products are strongly dependent on each other due to their prerequisite relationship. As a result, each resulting candidate upgrade combination may comprise at least one sub-group of software products 402. The number and the software products in different candidate upgrade combinations are different.

In some embodiments, if one or more standalone software products 402 are discarded and their sub-groups are not existed, the software analysis system 410 may determine one or more candidate upgrade combinations based on the remaining sub-groups, each of the plurality of candidate upgrade combinations comprising a different combination among the at least one remaining sub-group.

Figure 8C:
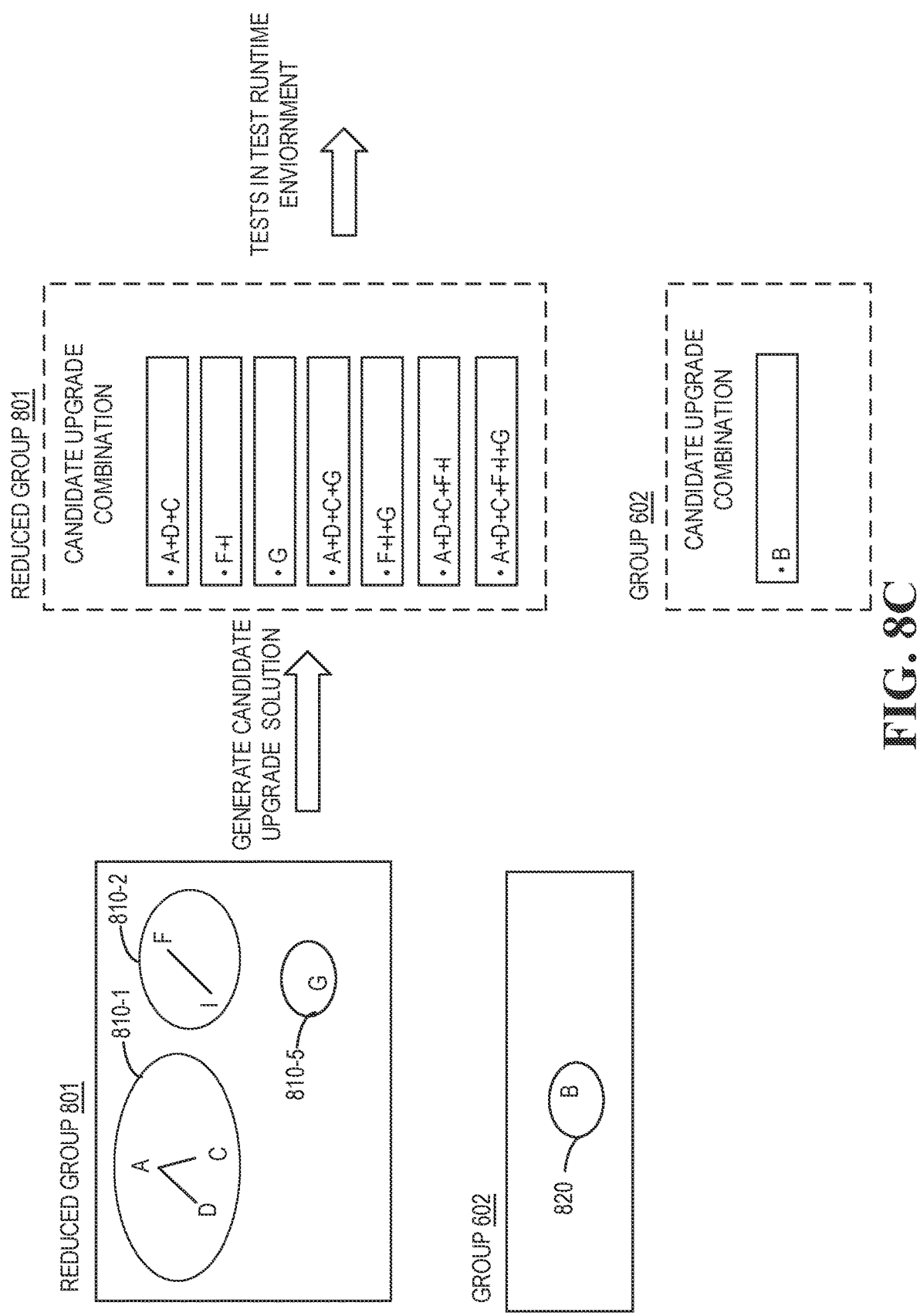
FIG. 8C depicts a third example for determining a target upgrade solution in accordance with some embodiments of the present disclosure.
Figure 8D:
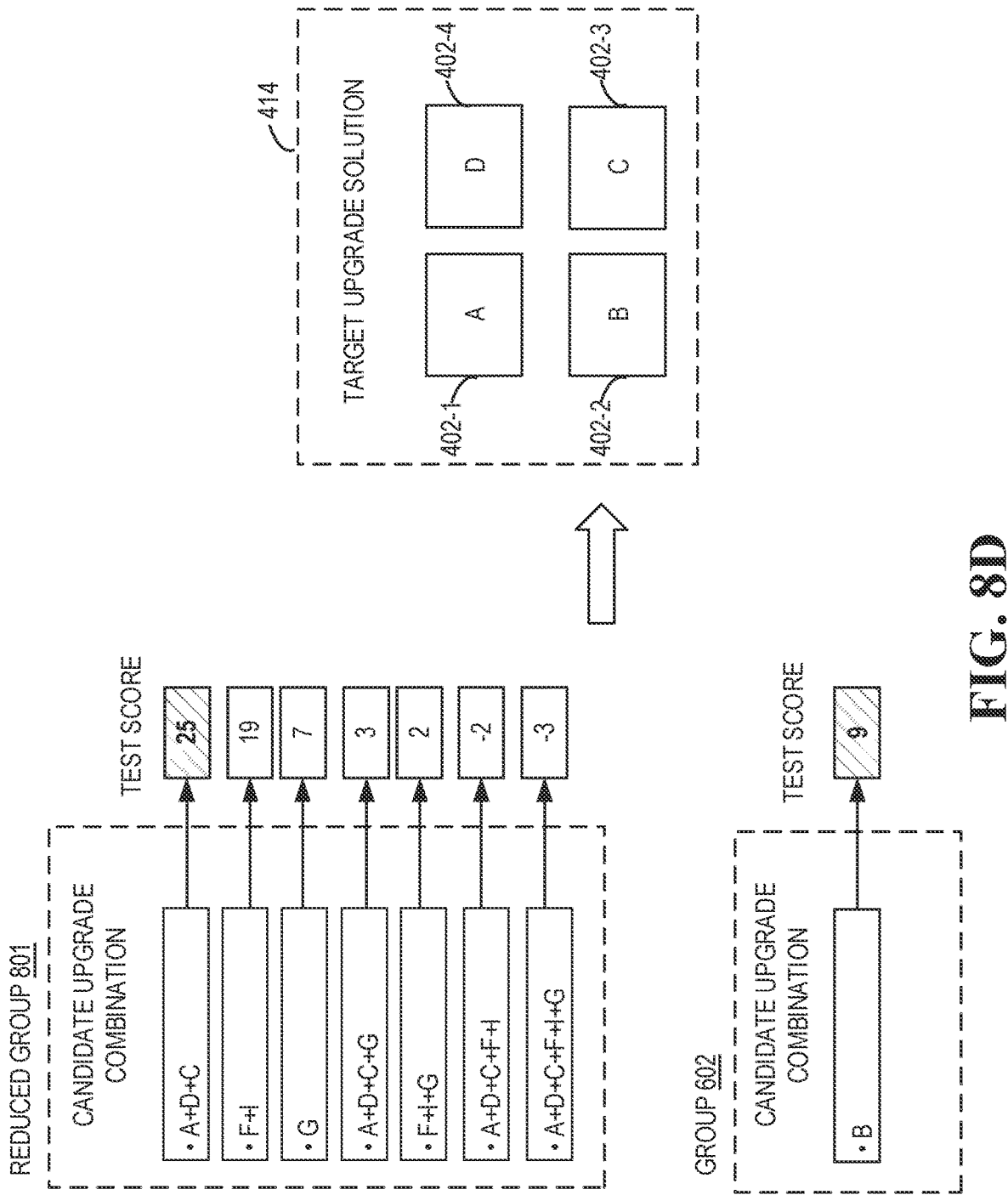
FIG. 8D depicts a fourth example for determining a target upgrade solution in accordance with some embodiments of the present disclosure.

FIG. 8C illustrates an example of determining candidate upgrade combinations. For the reduced group 801 that is pruned from the group 601, since there are three sub-groups 810-1, 810-2 and 810-5, there are a total of seven different candidate upgrade combinations, as illustrated in FIG. 8C. For the group 602, a standalone software product B forms a sub-group 820. Thus, one candidate upgrade combination is determined for the group 602.

At block 740, the software analysis system 410 determines a test score associated with each of the candidate upgrade combination(s) within each group (or reduced group). For each candidate upgrade combination, the software product(s) 402 comprised in the candidate upgrade combination may be updated to their upgraded version and installed in the test run environment 420 with the target software product 401. Then the test score is determined to measure a performance enhancement degree achieved by the software upgrading.

After the sub-process 705 is looped for each of the plurality of groups of software products 402, the software analysis system 410 may determine one or more test scores for one or more candidate upgrade combinations in each group. Then at block 750, the software analysis system 410 selects at least one candidate upgrade combination from at least one of the plurality of groups. At block 760, the software analysis system 410 determines the target upgrade solution for the target software product 401 by merging the software product(s) 402 comprised in the at least one selected candidate upgrade combination.

In some embodiments, the software analysis system 410 may select a candidate upgrade combination from each of the groups, for example, the candidate upgrade combination having the highest test score in each group. The software analysis system 410 may thus determine the target upgrade solution 414 to indicate upgrading of the software products comprised in the selected target upgrade combinations.

FIG. 8C illustrates an example of determining candidate upgrade combinations. Test scores associated with each candidate upgrade combination in the reduced group 801 and the group 602 are determined, as illustrated in FIG. 8C. The software analysis system 410 may select the candidate upgrade combination of software products A, D, and C which has the higher test score of 25 in the reduced group 801. The software analysis system 410 may select the candidate upgrade combination of the software product B in the group 602 because this is the only combination in this group. The target upgrade solution 414 may be generated to indicate upgrading of the software products A, B, C, and D for the target program product.

In some embodiments, for each group, the software analysis system 410 may compare the at least one test score associated with at least one candidate upgrade combination in the group with a threshold score (for the purpose of discussion, referred to as "a second threshold score"). The software analysis system 410 may select a candidate upgrade combination having the test score above the second threshold score (higher than or equal to the second threshold score). The software analysis system 410 may determine the target upgrade solution 414 to at least indicate upgrading of the software products comprised in the selected target upgrade combinations. That is, the software analysis system 410 may select the candidate upgrade combination with a relatively large test score for generating the target upgrade solution 414.

In some embodiments, more than one candidate combination may be selected from a group, and more than one target upgrade solution may be determined. For example, in FIG. 8D, in addition to the candidate upgrade combination of software products A, D, and C, the candidate upgrade combination of software products F and I may also be selected. A target upgrade solution indicating upgrading of A, B, C, and D, and another target upgrade solution indicating upgrading of B, F, and I may be determined for the target software product. In some embodiments, more than one target upgrade solution may be provided as a recommendation to the user for selection.

In some embodiments, if a test score associated with a candidate upgrade combination of a third group of the plurality of groups indicates a negative performance enhancement degree, for example, the test score is a negative value, it means that the upgraded version of the software product comprised in the candidate upgrade combination may have a negative impact on the performance of the target software product. In such case, the software analysis system 410 may exclude the at least one software product comprised in the candidate upgrade combination from the target upgrade solution 414. As such, it is possible to avoid negative performance impact caused by the software upgrading.

In some embodiments, if the test score associated with a candidate upgrade combination of a third group of the plurality of groups is relatively small, the at least one software product comprised in the candidate upgrade combination may also be excluded from the target upgrade solution 414.

It should be noted that the software upgrading or the software analysis system 410 according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying a target software product that depends on a plurality of software products;
determining, by one or more processors, respective dependency degrees between the plurality of software products, wherein the determining is based on correlation of property information related to a plurality of upgraded versions of the plurality of software products;
dividing, by one or more processors, the plurality of software products into a plurality of groups of software products based on the respective dependency degrees, each group comprising at least one of the plurality of software products;
dividing, by one or more processors, a first group of software products from the plurality of groups into a plurality of sub-groups of software products, each of the plurality of sub-groups comprising at least one pair of software products having a prerequisite relationship or comprising a standalone software product having no prerequisite relationship with other software products;
determining, by one or more processors, candidate upgrade combinations based on the grouping of the plurality of sub-groups, wherein for each candidate upgrade combination a particular sub-group of software products is all update or not updated;
determining, by one or more processors, a plurality of test scores associated with the candidate upgrade combinations, each test score indicating a performance enhancement degree of the target software product achieved by installing at least one upgraded version of at least one software product according to a respective one of the candidate upgrade combinations; and
determining, by one or more processors, a target upgrade solution for the target software product based on the plurality of test scores, the target upgrade solution indicating upgrading a first sub-group of the plurality of sub-groups and not upgrading a second sub-group of the plurality of sub-groups, wherein the first sub-group includes multiple software products.

2. The method of claim 1, wherein determining the plurality of test scores comprises:
determining, by one or more processors, at least one test score associated with at least one candidate upgrade combination by installing the associated upgrade combination in a test runtime environment configured for the target software product.

3. The method of claim 2, wherein determining the target upgrade solution comprises:
comparing, by one or more processors, the at least one test score associated with at least one candidate upgrade combination of a first group of the plurality of groups with a second threshold score;
selecting, by one or more processors and from a first target upgrade combination, from the at least one candidate upgrade combination for the first group having the test score above the second threshold score; and
determining, by one or more processors, the target upgrade solution to at least indicate upgrading of at least one software product comprised in the first target upgrade combination.

4. The method of claim 3, wherein determining the target upgrade solution further comprises:
comparing, by one or more processors, the at least one test score associated with at least one candidate upgrade combination of a second group of the plurality of groups with the second threshold score;
selecting, by one or more processors and from the at least one candidate upgrade combination, a second target upgrade combination for the second group having the test score above the second threshold score; and
determining, by one or more processors, the target upgrade solution to further indicate upgrading of at least one software product comprised in the second target upgrade combination.

5. The method of claim 3, wherein determining the target upgrade solution further comprises:
in accordance with a determination that a test score associated with a candidate upgrade combination of a third group of the plurality of groups indicates a negative performance enhancement degree, excluding, by one or more processors, at least one software product comprised in the candidate upgrade combination from the target upgrade solution.

6. The method of claim 1, wherein determining candidate upgrade combinations based on the grouping of the plurality of sub-groups comprises:
in accordance with a determination that the second sub-group of the plurality of sub-groups comprises a standalone software product,
determining, by one or more processors, a candidate test score associated with the standalone software product,
comparing, by one or more processors, the candidate test score with a first threshold score, and
in accordance with a determination that the candidate test score is below the first threshold score, discarding, by one or more processors, the second sub-group from the first group; and
determining, by one or more processors, the target upgrade solution based on at least one remaining of the plurality of sub-groups.

7. A system comprising:
a processing unit; and
a memory coupled to the processing unit and storing instructions thereon, the instructions, when executed by the processing unit, performing acts including:
identifying a target software product that depends on a plurality of software products;
determining respective dependency degrees between the plurality of software products, wherein the determining is based on correlation of property information related to a plurality of upgraded versions of the plurality of software products;

dividing the plurality of software products into a plurality of groups of software products based on the respective dependency degrees, each group comprising at least one of the plurality of software products;

dividing a first group of software products from the plurality of groups into a plurality of sub-groups of software products, each of the plurality of sub-groups comprising at least one pair of software products having a prerequisite relationship or comprising a standalone software product having no prerequisite relationship with other software products;

determining candidate upgrade combinations based on the grouping of the plurality of sub-groups, wherein for each candidate upgrade combination a particular sub-group of software products is all update or not updated;

determining a plurality of test scores associated with the candidate upgrade combinations, each test score indicating a performance enhancement degree of the target software product achieved by installing at least one upgraded version of at least one software product according to a respective one of the candidate upgrade combinations; and determining a target upgrade solution for the target software product based on the plurality of test scores, the target upgrade solution indicating upgrading a first sub-group of the plurality of sub-groups and not upgrading a second sub-group of the plurality of sub-groups, wherein the first sub-group includes multiple software products.

8. The system of claim 7, wherein determining the plurality of test scores comprises:

determining at least one test score associated with at least one candidate upgrade combination by installing the associated upgrade combination in a test runtime environment configured for the target software product.

9. The system of claim 8, wherein determining the target upgrade solution comprises:

comparing the at least one test score associated with at least one candidate upgrade combination of a first group of the plurality of groups with a second threshold score;

selecting, from the at least one candidate upgrade combination, a first target upgrade combination for the first group having the test score above the second threshold score; and determining the target upgrade solution to at least indicate upgrading of at least one software product comprised in the first target upgrade combination.

10. The system of claim 9, wherein determining the target upgrade solution further comprises:

comparing the at least one test score associated with at least one candidate upgrade combination of a second group of the plurality of groups with the second threshold score;

selecting, from the at least one candidate upgrade combination, a second target upgrade combination for the second group having the test score above the second threshold score; and determining the target upgrade solution to further indicate upgrading of at least one software product comprised in the second target upgrade combination.

11. The system of claim 7, wherein determining candidate upgrade combinations based on the grouping of the plurality of sub-groups comprises:

in accordance with a determination that the second sub-group of the plurality of sub-groups comprises a standalone software product, determining a candidate test score associated with the standalone software product, comparing the candidate test score with a first threshold score, and in accordance with a determination that the candidate test score is below the first threshold score, discarding the second sub-group from the first group; and determining the target upgrade solution based on at least one remaining of the plurality of sub-groups.

12. The system of claim 7, wherein determining the target upgrade solution further comprises:

in accordance with a determination that a test score associated with a candidate upgrade combination of a third group of the plurality of groups indicates a negative performance enhancement degree, excluding at least one software product comprised in the candidate upgrade combination from the target upgrade solution.

13. A computer program product, the computer program product comprising a computer readable storage medium having program instructions embodied therewith, the program instructions executable by an electronic device to cause the electronic device to perform acts comprising:

identifying a target software product that depends on a plurality of software products;

determining respective dependency degrees between the plurality of software products, wherein the determining is based on correlation of property information related to a plurality of upgraded versions of the plurality of software products;

dividing the plurality of software products into a plurality of groups of software products based on the respective dependency degrees, each group comprising at least one of the plurality of software products;

dividing a first group of software products from the plurality of groups into a plurality of sub-groups of software products, each of the plurality of sub-groups comprising at least one pair of software products having a prerequisite relationship or comprising a standalone software product having no prerequisite relationship with other software products;

determining candidate upgrade combinations based on the grouping of the plurality of sub-groups, wherein for each candidate upgrade combination a particular sub-group of software products is all update or not updated;

determining a plurality of test scores associated with the candidate upgrade combinations, each test score indicating a performance enhancement degree of the target software product achieved by installing at least one upgraded version of at least one software product according to a respective one of the candidate upgrade combinations; and determining a target upgrade solution for the target software product based on the plurality of test scores, the target upgrade solution indicating upgrading a first sub-group of the plurality of sub-groups and not upgrading a second sub-group of the plurality of sub-groups, wherein the first sub-group includes multiple software products.

14. The computer program product of claim 13, wherein determining the plurality of test scores comprises:
  determining at least one test score associated with the at least one candidate upgrade combination by installing the associated upgrade combination in a test runtime environment configured for the target software product.

15. The computer program product of claim 14, wherein determining the target upgrade solution comprises:
  comparing the at least one test score associated with at least one candidate upgrade combination of a first group of the plurality of groups with a second threshold score;
  selecting, from the at least one candidate upgrade combination, a first target upgrade combination for the first group having the test score above the second threshold score; and
  determining the target upgrade solution to at least indicate upgrading of at least one software product comprised in the first target upgrade combination.

16. The computer program product of claim 15, wherein determining the target upgrade solution further comprises:
  comparing the at least one test score associated with at least one candidate upgrade combination of a second group of the plurality of groups with the second threshold score;
  selecting, from the at least one candidate upgrade combination, a second target upgrade combination for the second group having the test score above the second threshold score; and
  determining the target upgrade solution to further indicate upgrading of at least one software product comprised in the second target upgrade combination.

17. The computer program product of claim 13, wherein determining candidate upgrade combinations based on the grouping of the plurality of sub-groups comprises:
  in accordance with a determination that the second sub-group of the plurality of sub-groups comprises a standalone software product,
    determining a candidate test score associated with the standalone software product,
    comparing the candidate test score with a first threshold score, and
    in accordance with a determination that the candidate test score is below the first threshold score, discarding the second sub-group from the first group; and
  determining the target upgrade solution based on at least one remaining of the plurality of sub-groups.

* * * * *